United States Patent [19]

Sekiguchi

[11] 4,114,773

[45] Sep. 19, 1978

[54] FEEDING DEVICE OF A CONCRETE BLOCK SPLITTING APPARATUS

[75] Inventor: Yoji Sekiguchi, Maebashi, Japan

[73] Assignee: Katsura Machine Co., Ltd., Maebashi, Japan

[21] Appl. No.: 822,323

[22] Filed: Aug. 5, 1977

[30] Foreign Application Priority Data

Aug. 12, 1976 [JP] Japan ........................... 51-108112[U]

[51] Int. Cl.[2] .............................................. B65G 25/04

[52] U.S. Cl. .................................... 214/623; 198/485; 198/572; 198/600

[58] Field of Search ............. 125/23 R, 23 C, 1, 23 T, 125/24, 35; 214/95 R, 622, 623, 89; 198/339, 470, 485, 572, 575, 600

[56] References Cited

FOREIGN PATENT DOCUMENTS 1,387,387 3/1975 United Kingdom ..................... 198/485

*Primary Examiner*—Evon C. Blunk
*Assistant Examiner*—James L. Rowland
*Attorney, Agent, or Firm*—Fleit and Jacobson

[57] ABSTRACT

An improved feeder of a concrete block splitting apparatus which splits a concrete block to form natural looking stone surfaces for gateposts, walls, etc. The feeder has a table which moves in the vertical direction with the concrete block thereon, and receiving members which receive the concrete block when the concrete block is lifted to the predetermined position. The table can be lowered to the original position for successive operations of concrete block lifting while the concrete block is held by the receiving member for the purpose of being fed toward a splitting apparatus.

8 Claims, 8 Drawing Figures

FEEDING DEVICE OF A CONCRETE BLOCK SPLITTING APPARATUS

BACKGROUND OF THE INVENTION

The present invention relates generally to an apparatus for splitting a concrete-block to form unartificial looking or natural looking stone surfaces for walls, gateposts, etc., and more particularly to a feeder for the concrete block splitting apparatus.

Conventionally, a fedder which is disposed adjacent to a splitting apparatus has a conveyor and a table which is lifted up and down in the vertical direction. A concrete block is fed by the conveyor toward the splitting apparatus until the concrete block contacts a stopper which is disposed at one end of the table. When the concrete block is contacted to the stopper of the table, a limit switch is actuated simultaneously to stop the movement of the conveyor and then to drive a cylinder to lift the table to the predetermined position until another limit switch is actuated to stop the upward movement of the table. A pusher device, which is disposed above the aforementioned conveyor, is driven to push the concrete block on the table toward the splitting device. After the concrete block is positioned at the predetermined position of the splitting device, the latter is driven to split the delivered concrete block to form natural looking surfaces. After the concrete block is pushed away from the table by the pusher device, the cylinder is driven again to lower the table to the original position for successive operation. Thus, the table should be maintained at the predetermined upper level until the concrete block on the table is completely fed out of the table to the desired position of the splitting apparatus, and therefore, the successive operation for lifting concrete blocks to the predetermined position for the purpose of delivering the lifted concrete block toward the splitting apparatus should be waited or suspended until the concrete block which is lifted by table is pushed out of the table.

According to the aforementioned conventional prior art, the applicant has found it to be time-consuming since, as described above, successive operation for feeding additional concrete blocks to be treated by the splitting apparatus is not carried out until the table is retracted to the original lower position after the preceding concrete block, which is positioned on the table, is fully pushed toward the splitting apparatus. This is a particularly remarkable disadvantage in such a case that plural concrete blocks are positioned on the table and lifted to the predetermined position simultaneously, because the table should be stood still until all of the concrete blocks on the table are fed out of the table by the pusher device.

Accordingly, an object of the present invention is to provide an improved feeder which permits a continuous and efficient operation.

Another object of the present invention is to provide an improved feeder, in which a concrete block can be fed to a splitting apparatus whereas a table can be lowered simultaneously to the original position for successive operation.

Another object of the present invention is to provide an improved feeder which is simple in construction and presents a reliable operation.

Further object of the present invention is to provide an improved feeder which can be facilitated at a relatively small floor space.

Other objects and features of the present invention will become apparent from the detailed description of preferred embodiment thereof, which will be made with reference to the accompanying drawings.

DESCRIPTION OF THE DRAWINGS

FIG. 5 shows the feeder in the course of raising a concrete block;

FIG. 6 shows the feeder at its uppermost limit of movement;

FIG. 7 shows the feeder in the course of lowering to its position for receiving a subsequent concrete block.

DETAILED DESCRIPTION OF THE INVENTION

Figure 1:
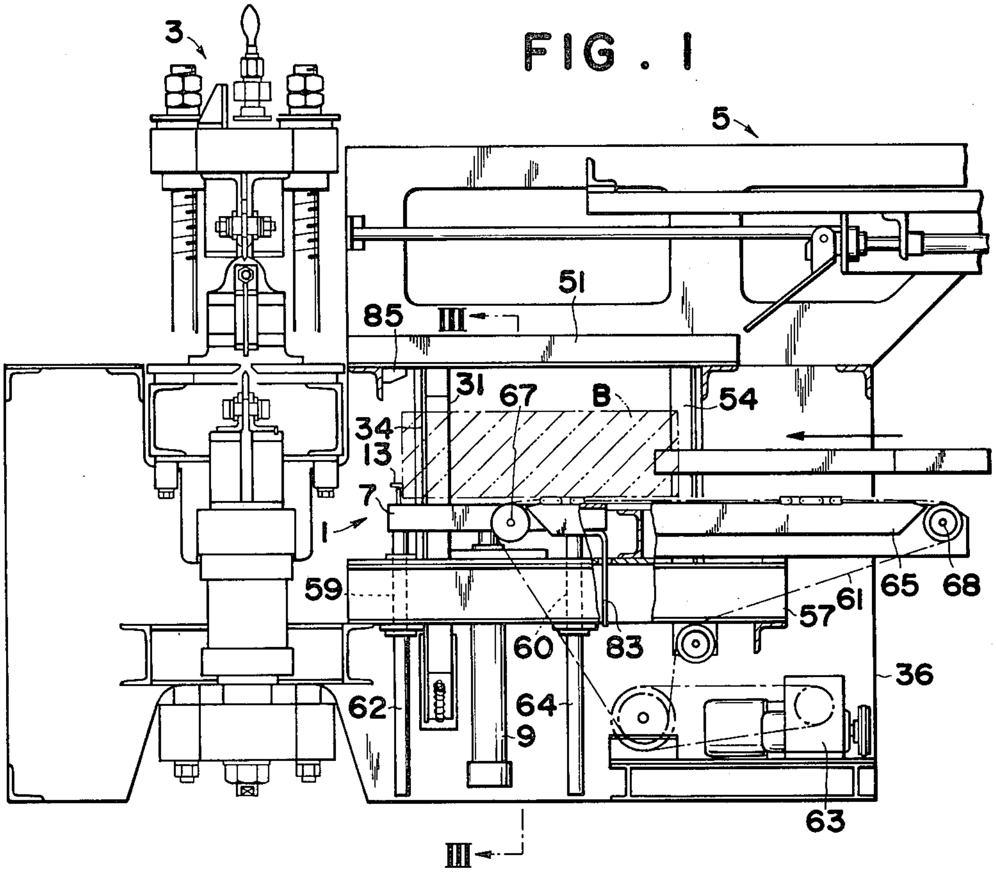
FIG. 1 is an elevational view, partly sectioned, of a concrete block splitting apparatus which includes a feeder embodying the present invention.
Figure 2:
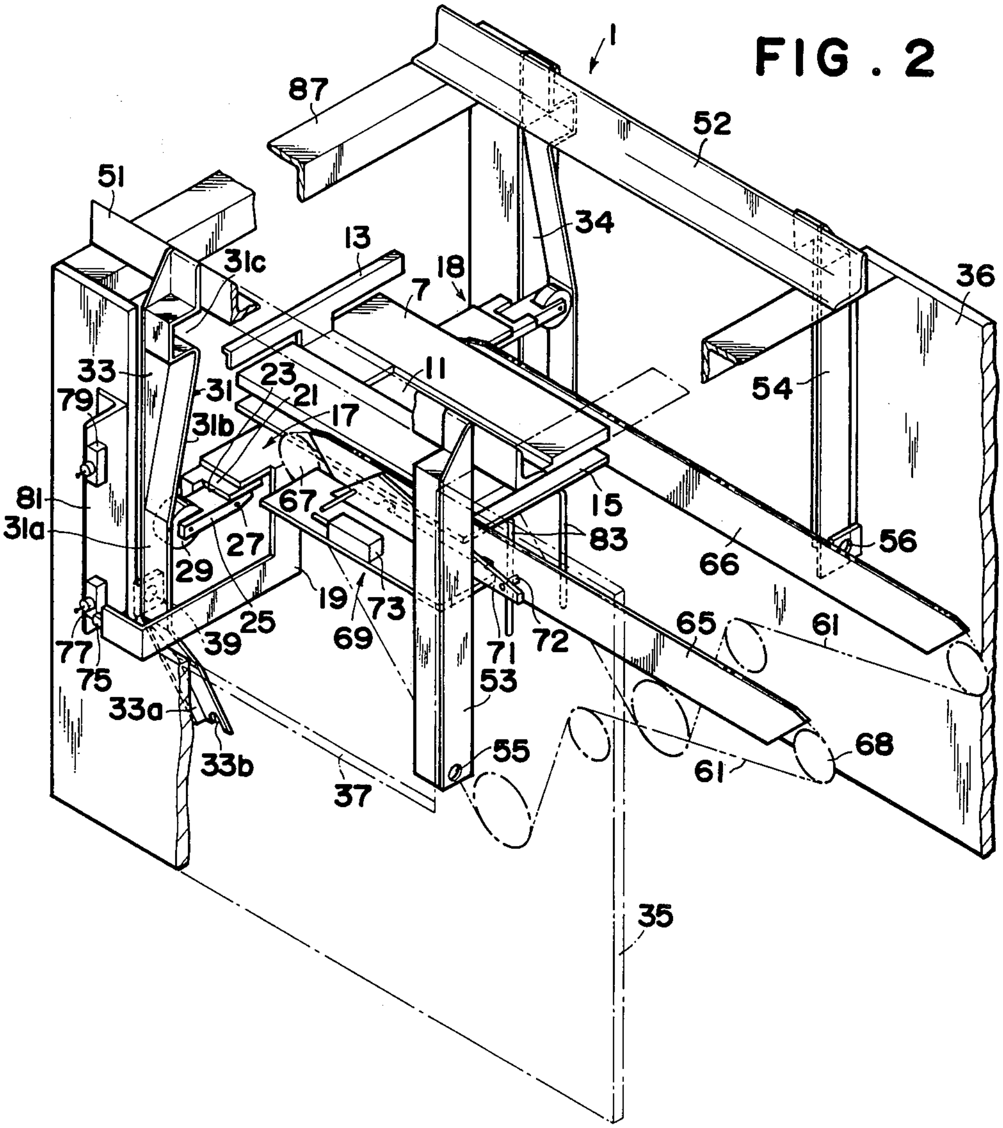
FIG. 2 is a perspective view of the feeder illustrated in FIG. 1, showing members for receiving a concrete block.

Like reference numerals represent like parts in the different views of the drawing. In FIGS. 1 through 4, a feeder 1 of the present invention is installed adjacent to the conventional concrete block splitting apparatus 3 and pusher device 5. These conventional apparatus 3 and 5 are well known in the art, and no detailed description will be made. The feeder 1 comprises a table 7 which is lifted up and down by a fluid hydraulic cylinder 9. The table 7 is of rectangular shape and has a groove 11 along the lengthwise direction thereof. Within the groove is slidably disposed a leg of a stopper 13 which is fixed at a desired position of the table 7. A rectangular plate 15 is connected to the bottom of the table through suitable members with an air space between the plate 15 and the table 7. The plate 15 has two hands, which is generally designated at 17 and 18, extending in the opposite directions, as well as shown in FIG. 2. One of the hands 17, 18, namely the hand 17 of FIG. 2, has a member 19 which extends downwardly and then outwardly.

The hands 17, 18 are quite similar with each other in structure and symmetrical with respect to a longitudinal central line of the table 7, and therefore a description will be made with respect to the hand 17 in connection with the drawings, particularly FIGS. 2 and 5. The hand 17 has a block 21 having an inclined recess 23, and an arm 25. The arm 25 is pivotably connected to the block by a pin 27 such that the arm can be pivoted upwardly about the pin 27. The block 21 prevents the arm from pivoting in the downward direction since the end of the arm abuts an extension of the recessed block 21. The arm 25 has at its outer end a roller 29 which rotate along a guide surface 31 which will be described.

Figure 3:
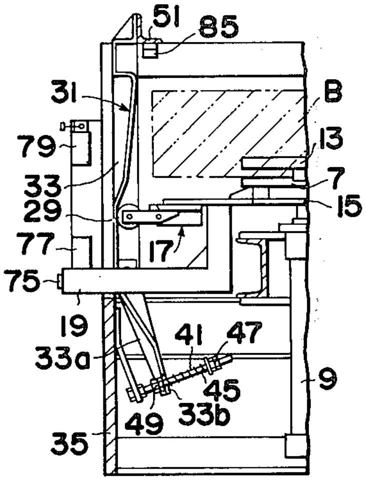
FIG. 3 is a fragmentary sectioned view of the feeder, taken along III—III of FIG. 1.
Figure 4:
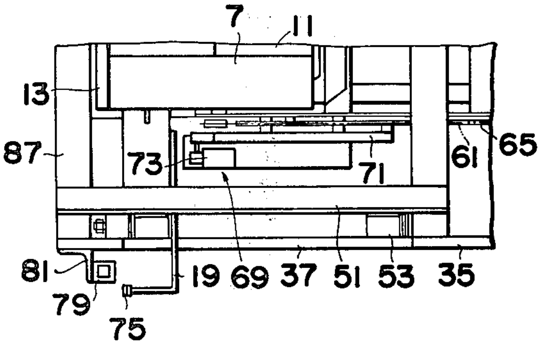
FIG. 4 is a fragmentary top plan view of the feeder shown in FIG. 1.

Legs 33 and 34 are pivotally connected to frames 35 and 36. The legs as well as the frames are of similar structure, and discription will be made with reference to the leg 33 and the frame 35. The leg 33 has a guide surface 31 which has a lower portion 31*a*, a middle inwardly inclined portion 31*b* and upper recessed portion constituting a part, 31*c*. The leg 33 is pivotally connected to the frame 35 by a pin 39. The frame 35 has a window 37 and is U-shaped as illustrated in FIG. 2. The leg 33 has a lower portion 33*a* which is slightly inclined inwardly, and a recess 33*b* at its lower extremity. A threaded rod 41 is inserted through the recess 33*b*, as well shown in FIG. 5, and the rod 41 is connected its both ends to the frame 35 through members 43, 44. The rod 41 has a spiral spring 45 between nuts 47 and 49. The nut 49 is positioned such that the leg 33 is vertical as illustrated in FIG. 3.

On top of the legs 33, 34 are provided an elongated receiving member 51, 52 which are "L" shaped in cross section. The receiving members 51 and 52 are supported at their one end by supporting members 53 and 54. The supporting members 53 and 54 are connected at their upper end to the opposite portion of the receiving members 51, 52 and to the frames 35, 36 pivotally at the lower end 55, 56 thereof. Thus, the receiving members 51, 52 as well as the legs 33, 34 and the supporting members 53, 54 are outwardly pivotable against the force of the spiral springs 45, such that the members 33, 34, 53, 54 are inclined out of the windows 37 of the frames 35, 36.

The fluid hydraulic cylinder 5 is suspended by a supporting frame 57 which is installed below the table 7. The piston rod of the cylinder 5 is connected to the base plate 15 of the table such that the table 7 is moved in the vertical direction. The supporting frame 57 has through-holes 59, 60 through which guide rods 62, 64, top end of which is connected to the table 7, are inserted so that the table 7 is moved in the correct vertical direction.

Conveyor chains 61 are disposed which are driven by a driving device 63 and sprockets. The driving device 63 is conventional and no detailed explanation will be made. The conveyor chains 61 are supported, or guided, by guide plates 65, 66 which are connected by a desired means to the supporting frame 57, the guide plates 65, 66 prevent the conveyor chains from being curved downwardly, particularly at the chain portion between the sprockets 67 and 68.

At the side of the guide plate 65, a limit switch device, which is generally illustrated at 69, is provided. The limit switch device 69 has a plate 71 pivotably connected to the guide plate 65 at one end 72. The plate 71 has at its other end a pin which will be contacted to a limit switch 73 when the plate is pivoted about the end 72.

The member 19, which extends downwardly and outwardly from the block 21 as well shown in FIG. 2, has a protrusion 75 which will contact limit switches 77, 79 in operation. The limit switches 77 and 79 are connected to the frame 35 and aligned vertically. As shown in FIGS. 2 and 5, an elongated plate 81 is connected to the frame side of the window 37, and the limit switch 77 is fixed to the lower portion of the elongated plate 81 whereas the limit switch 79 is fixed to the upper portion. Though not illustrated, the limit switches 77, 79 are electrically connected to the cylinder 5.

It is preferred that a safety stopper 83 be provided such that it extends downward from the bottom of the table 7 so as to prevent an accidental feeding of additional concrete block toward the table 7.

Further, it is preferred a block-like members 85 (FIG. 5) be connected to the bottom of the receiving members 51 and 52 such that the block-like members 85 may slightly touch a side of a cross beam 87 which is connected to the frames 35 and 36. The block-like members 85 will prevent an objectionable lateral movement of the legs 33, 34. Namely, when a concrete block on the table 7 is fed by the conventional pusher device 5 to the conventional splitting apparatus 3, the block-like members 85 prevent the legs 33, 34 from being swayed by the pushing force of the pusher device 5.

Figure 5:
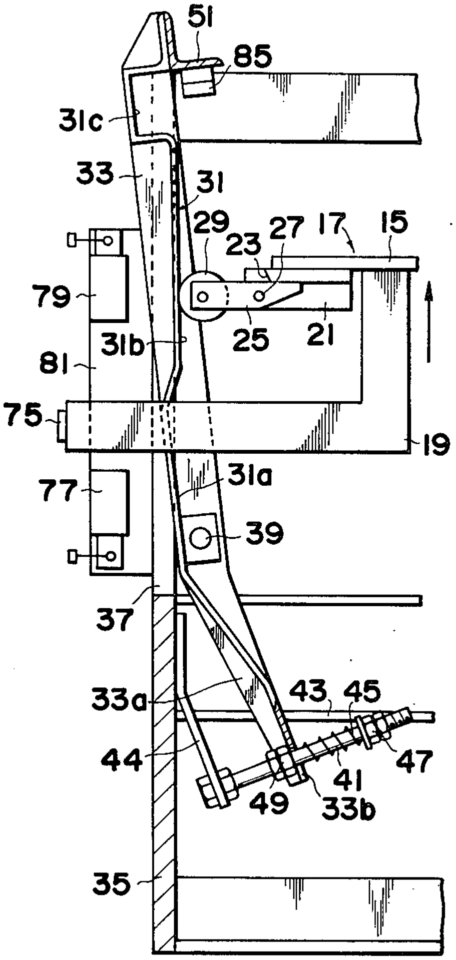
FIGS. 5, 6 and 7 are fragmentary side views of the feeder, showing an operation of concrete block lifting table and a leg which has the concrete block receiving member.
Figure 8:
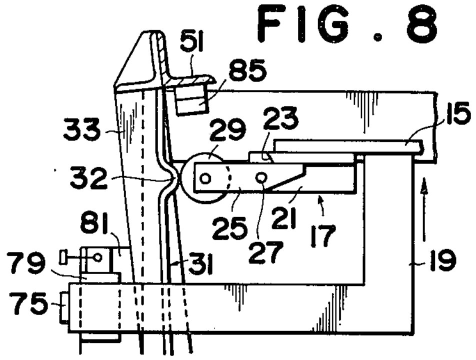
FIG. 8 is a fragmentary side view of the feeder in accordance with another embodiment of the present invention.

In FIG. 8 which shows another embodiment of the invention, the leg 33 has a guide surface 31 which has a curved protrusion 32 rather than the recessed portion 31*c* of FIG. 5. That portion of the guide surface 31 above the protrusion 32 constitutes a port.

Figure 6:
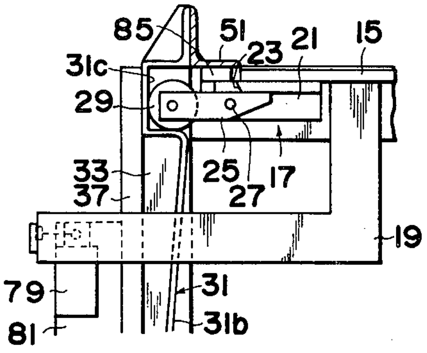
Figure 7:
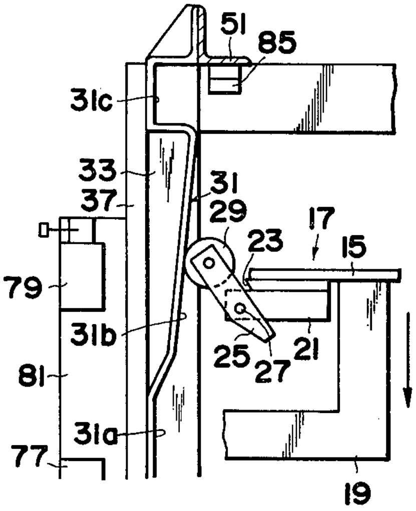

An operation of the feeding device according to the present invention will be described with reference to FIGS. 1, 2, 5, 6 and 7. A concrete block B is fed by the conveyor chains 61 which are driven by the driving device 63 toward the table 7 as illustrated by an arrow (FIG. 1). When the concrete block is fed onto the suitable position of the table 7 until the concrete block B contacts the stopper 13, the pivotable plate 71 is pivoted about the pin by the bottom of the concrete block B to thereby contact the limit switch 73. Thus the driving device 63 is stopped to cease a further movement of the concrete block B. Then the fluid hydraulic cylinder 9 is actuated to lift the table 7 in the upward direction while the concrete block is positioned on the table 7. In case of the upward movement of the table 7, the rollers 29 of the hands 17 and 18 rotate along the guide surface 31 of the legs 33, 34. As the rollers 29 as well as the table 7 move upward, the legs 33, 34 are pivoted outwardly about the pins 39 since the guide surface 31 is inwardly inclined, as illustrated at 31*b*. When the rollers 29 of the hands 17, 18 are lifted upward, the legs 33, 34 are pivoted outwardly, out of the windows 37 of the frames 35, 36, against the force of the springs 45. After a further upward movement of the table 7, the rollers 29 come into the recesses 31*c* of the guide surface 31 as shown in FIG. 6, and immediately the legs 33, 34, which have been pivoted outwardly, retract to the original position by the force of the springs 45. At this moment, the concrete block is lifted slightly higher than the receiving members 51, 52. Immediately after the rollers 29 are secured within the recessed portion 31*c* of the legs 33, 34, the member 19, which moves in the vertical direction together with the table 7 and the rollers 29, contacts the limit switch 79 which defines the upper extremity of the vertical movement of the table. When the limit switch is actuated by the member 19, the operation of the fluid hydraulic cylinder 9 is stopped, and then the cylinder is driven again to lower the table 7 while the concrete block B is being held by the receiving members 51, 52. In the lowering operation of the table 7, the arms 25 will be pivoted upwardly about the pin 27 as illustrated in FIG. 7. As aforementioned, the arms 25 are pivotable upwardly about the pin 27, but not pivotable downwardly by the structure of the block 27. Therefore, the table 7 is readily retracted to the lower original position while the receiving members 51, 52 maintain holding the concrete block B. When the table is lowered to the lower extremity of its vertical movement for the successive operation, the member 19 contacts the limit switch 77 to stop the operation of the cylinder 9.

The concrete block B secured by the receiving members 51, 52 is then pushed toward the known splitting apparatus 3 (FIG. 1) by means of the known pusher device 5. In this case, the concrete block is slided on the receiving members 51, 52 by the pusher device 5, and therefore the legs 33, 34 as well as the receiving members 51, 52 are likely to be swayed toward the splitting apparatus 3. However, the objectional sway is prevented by the block-like members 85 which will contact the cross beam 87 of the frames 35, 36.

The construction of the guide surface 31 of the legs 33, 34 according to a second embodiment shown in FIG. 8 will quite similar in operational mode. In this embodiment, the legs 33, 34 will be retracted to the vertical posture to hold the concrete block immediately after the rollers 29 comes to the portion right above the protruded portion 32 of the guide surface 31. The protruded portion 32 is disposed at a portion of the guide surface lower than the recess 31*c* of the first embodiment of FIG. 5.

According to the present invention, the upward movement of the table and the concrete block forces the legs 33, 34 to pivot outwardly as well as the receiving members 51, 52, and the legs retract to the original position by the force of the springs 45 when the table is lifted to the predetermined position. Thus, the retracted receiving members 51, 52 hold the concrete block. Immediately after the concrete block is held by the receiving members, the table can be lowered to the original position to wait for a successive operation of the upward lifting of concrete blocks.

Though the present invention has been described with reference to the preferred embodiment thereof, many modifications and alterations may be made within the spirit of the present invention.

What is claimed is:

1. A feeding device of a concrete block splitting apparatus, comprising:

a frame structure;

a table for lifting a concrete block up to a predetermined position;

said table having upwardly pivotable arms extending in the opposite direction, said arms each having a roller at the end thereof;

means for moving said table in the vertical direction;

legs outwardly pivotably connected to said frame structure at the opposite sides with respect to said table;

said legs each having a spring at the lower portion thereof to maintain the legs in a vertical posture, an inclined portion and a port for securing rollers of the arms at the position above said inclined portion, and receiving members for supporting the concrete block at the predetermined position;

said receiving member being connected to the upper portion of said legs, whereby as said table with the concrete block placed thereon is moved upward together with said arms and rollers, said legs are pivoted outwardly and retracted to the original position to receive the concrete block.

2. The feeding device in accordance with claim 1, in which each of said arms has a block having a recess at its one end and an extended upper portion adjacent to said recess, said arms being pivotally connected to said block such that said extended upper portion of the block contacts one end portion of said arms, thereby preventing a downward pivotal movement of said arms.

3. The feeding device in accordance with claim 1, in which said receiving members are elongated plates having an L shape in cross section and said legs are connected to one end portion of said elongated plates, said device further comprising supporting members pivotally connected to said frame structure, said supporting members being connected at the upper portion thereof to the other end portion of said elongated plates.

4. The feeding device in accordance with claim 1, in which said table is rectangular and has a groove in the longitudinal direction thereof, said table having a stopper slidably secured by said groove.

5. The feeding device in accordance with claim 1, in which said device further comprises a limit switch device and a contact member, said limit switch device having an upper limit switch and a vertically aligned lower limit switch, said contact member being connected to said table, thereby defining the upper and lower extremities of the vertical movement of said table.

6. The feeding device in accordance with claim 1, in which said port of the legs is concave, thereby securing said roller within said port.

7. The feeding device in accordance with claim 1, in which each of said legs include a semicircular protrusion and said port is defined by a portion of the legs above said semi-circular protrusion, thereby securing said roller above said protrusion.

8. The feeding device in accordance with claim 1, in which said frame structure has a crossbeam, said receiving members having a block member at the bottom adjacent to said crossbeam, thereby preventing a sway of said legs.

* * * * *